United States Patent
Schlecht (10) Patent No.: US 7,086,678 B2
(45) Date of Patent: Aug. 8, 2006

(54) SEPARATING DEVICE FOR A VEHICLE INTERIOR

(75) Inventor: Werner P. Schlecht, Vaihingen/Enz-Aurich (DE)

(73) Assignee: BOS GmbH & Co. KG, Ostfildern (DE)

( * ) Notice: Subject to any disclaimer, the term of this patent is extended or adjusted under 35 U.S.C. 154(b) by 4 days.

(21) Appl. No.: 10/835,508

(22) Filed: Apr. 29, 2004

(65) Prior Publication Data

US 2004/0217614 A1   Nov. 4, 2004

(30) Foreign Application Priority Data

Apr. 30, 2003   (DE) ................ 103 20 527

(51) Int. Cl.
*B60R 5/04* (2006.01)

(52) U.S. Cl. ..................... 296/24.43; 296/85

(58) Field of Classification Search ............ 296/24.43, 296/24.4, 85, 180.1; 280/748, 749
See application file for complete search history.

(56) References Cited

U.S. PATENT DOCUMENTS 3,931,994 A * 1/1976 Palmiter ................ 296/24.4
5,288,122 A * 2/1994 Pilhall ................. 296/24.43
6,336,670 B1   1/2002 Savås
6,485,094 B1 * 11/2002 Corder et al. ............. 296/222
2002/0014785 A1   2/2002 Sotiroff et al.

FOREIGN PATENT DOCUMENTS

| DE | 38 00 425 A1 | 7/1989 |
| DE | 41 28 555 A1 | 3/1992 |
| DE | 198 11 886 | 9/1999 |
| DE | 100 39 789 | 3/2002 |
| DE | 100 57 572 | 6/2002 |
| EP | 1 176 060 A2 | 1/2002 |
| FR | 2 645 479 | 10/1990 |

* cited by examiner

*Primary Examiner*—Stephen Gordon
(74) *Attorney, Agent, or Firm*—Flynn, Thiel, Boutell & Tanis, P.C.

(57) ABSTRACT

A separating device for a vehicle interior, with at least one dimensionally stable flat structure, is positioned upright in a protection position.

At least one transparent disk element is associated with the flat structure and is mounted so as to move in translatory manner parallel to the flat structure. In a protection position, it extends the flat structure in the vehicle height direction.

13 Claims, 6 Drawing Sheets

SEPARATING DEVICE FOR A VEHICLE INTERIOR

The invention relates to a separating device for a vehicle interior having at least one dimensionally stable flat structure, which is positioned upright in a protection position.

Such a separating device is generally known. The known separating device has a dimensionally stable frame in which is fixed a separating net. The frame together with the fixed separating net constitutes a dimensionally stable flat structure. The frame with the separating net is swivellable in a roof area of a vehicle interior between a rest position adjacent to the roof area and a protection position swivelled downwards to the level of a vehicle flange edge. In the protection position the frame and separating net are upright, i.e. positioned at an angle between 0 and 45ø to the vertical and is supported with a lower edge in the vicinity of a vehicle seat arrangement back.

The problem of the invention is to provide a separating device of the aforementioned type offering an improved separating function for the vehicle interior.

This problem is solved in that with the flat structure is associated at least one transparent disk element, which is mounted in translatory manner parallel to the flat structure and which in a protection position lengthens the flat structure in the vehicle height direction. The flat structure preferably has a dimensionally stable frame, in which is also mounted in translatory manner the dimensionally stable disk element. The dimensionally stable frame can be part of a dimensionally stable plate or box arrangement. It is alternatively possible to fix within the dimensionally stable frame a separating net in the manner known from the prior art. In its upright protection position, the flat structure preferably extends from a vehicle bottom or base to roughly level with a vehicle flange edge. The at least one disk element extends in its extended protection position preferably up to a roof area of the vehicle interior. Thus, as a result of the solution according to the invention a stable partition can be created over the entire vehicle interior height. The transparency of the at least one disk element enables a completely satisfactory through view in the protection position of the disk element, so that the view in particular of a vehicle driver is in no way impaired by the disk element transferred into its protection position. The solution according to the invention is particularly suitable for vehicles in which both people and luggage is transported.

In a development of the invention the flat structure is split in the same way as a back rest arrangement and the at least two parts are movable independently of one another and with each part is associated at least one disk element. This maintains the variability of a luggage space or area enlargement, even if the flat structure is positioned immediately behind or in the vicinity of a back rest arrangement.

According to a further development of the invention, the flat structure is designed as a plate arrangement and into it is integrated in linearly displaceable manner at least one disk element. Thus, in its rest position, the at least one disk element is invisibly countersunk in the plate arrangement. Both the plate arrangement and the disk element are so dimensionally stable that a reliable retaining support of luggage can be brought about even in the case of luggage accelerations or decelerations resulting from a vehicle impact.

According to a further development of the invention, the at least one disk element is linearly displaceably guided in a slot guide of the plate arrangement and a side of the slot guide which is open at the top in the operating position can be closed by a movable cover. Thus, the disk element is optically invisibly positioned in its countersunk rest position. In addition, the disk element is protected against dirtying in its rest position.

The problem of the invention is also solved in that the flat structure is movably mounted between a covering position flush with a vehicle bottom or base and at least one upright protection position and that the flat structure is so movably guided relative to the vehicle bottom by means of a forced guidance device that the flat structure can be transferred into at least two protection positions spaced relative to one another in the vehicle longitudinal direction. This solution significantly widens the use possibilities for the separating device compared with the prior art. In the bottom-flush covering position, the flat structure forms part of the vehicle bottom. In particular, in this position the flat structure can also cover a depression in a luggage space base, i.e. it has a covering function. In the upright protection position it can serve as a partition. As a result of the displaceability of the flat structure into at least two different protection positions a variable separation of the vehicle interior is made possible. The flat structure can be constructed as a partition in different areas of the vehicle interior, so that a variable segmentation of the vehicle interior can be obtained. The flat structure can be designed with one or more parts. In particular, the flat structure can also be constructed with at least one transparent disk element in accordance with the previously described constructions.

The solution according to the invention is suitable for use both in cars and utility vehicles.

According to a development of the invention, the forced guidance device has at least one combined linear guidance and swivelling kinematics, which on the one hand acts on the vehicle side and on the other on the flat structure. This brings about a stable mechanical solution in order to guide in a clearly defined manner the flat structure during its movements between the covering position and the protection position and preferably also secures the same in the end positions.

According to another development of the invention, the linear guidance and swivelling kinematics have at least one bracket, which in at least one upright protection position of the flat structure is transferred into an over dead centre position securing the protection position. This brings about a particularly simple, robust and operationally reliable mechanical supporting of the flat structure.

According to a further development of the invention, the dimensionally stable flat structure is associated in its rest position with a depression of the vehicle bottom and an adjacent, bottom-side covering element is provided, which when the flat structure is transferred into an upright protection position can be transferred into a closing position covering the depression. This ensures that even when the flat structure is upright, the depression in the vehicle bottom is covered. In its rest position the flat structure can either be used for covering the depression or it is positioned below an additional covering element, which covers the depression including the flat structure countersunk into the depression.

According to a further development of the invention, the covering element is movably mounted between a doubling position superimposing a further covering element and a cover position connected in aligned horizontal manner to the covering element. The covering element is preferably swivellably arranged on the further covering element, particularly by means of a hinge arrangement. Alternatively the covering element can be linearly displaceable on or under the further covering element.

According to a further development of the invention, the two covering elements have in the doubling position together roughly the thickness of the dimensionally stable flat structure. This embodiment is particularly advantageous if the flat structure is used for covering the depression and if in the flat structure, preferably in the form of a plate arrangement, is integrated at least one transparent disk element. Thus, through the integration of the disk element, the flat structure necessarily has a much greater thickness than is necessary for the adjacent covering elements for covering corresponding depressions in the vehicle bottom. As a result of the thickness adaptation of the covering elements, also in the rest position of the dimensionally stable flat structure, a planar vehicle bottom can be obtained.

According to a further development of the invention, in the vehicle longitudinal direction there are several depressions in the vehicle bottom for the reception of at least one foldable seat arrangement and the at least one dimensionally stable flat structure is displaceably guided over and beyond at least one depression or at least one folded seat arrangement by means of bottom-side guide arrangements in the vehicle longitudinal direction. Thus, as desired, the vehicle interior can be variably used as a luggage space or as a seating area for vehicle occupants. The flat structure can be extremely variably displaced in the vehicle longitudinal direction in the form of a partition without having to give up the forcibly guiding connection with the vehicle bottom in the vicinity of the countersunk seat arrangements. This design is particularly suitable for stretched limousines or also for commercial vehicles for conveying people and luggage, especially for buses.

Further advantages and features of the invention can be gathered from the following description of preferred embodiments, the attached claims and the drawings, wherein show:

Figure 3:
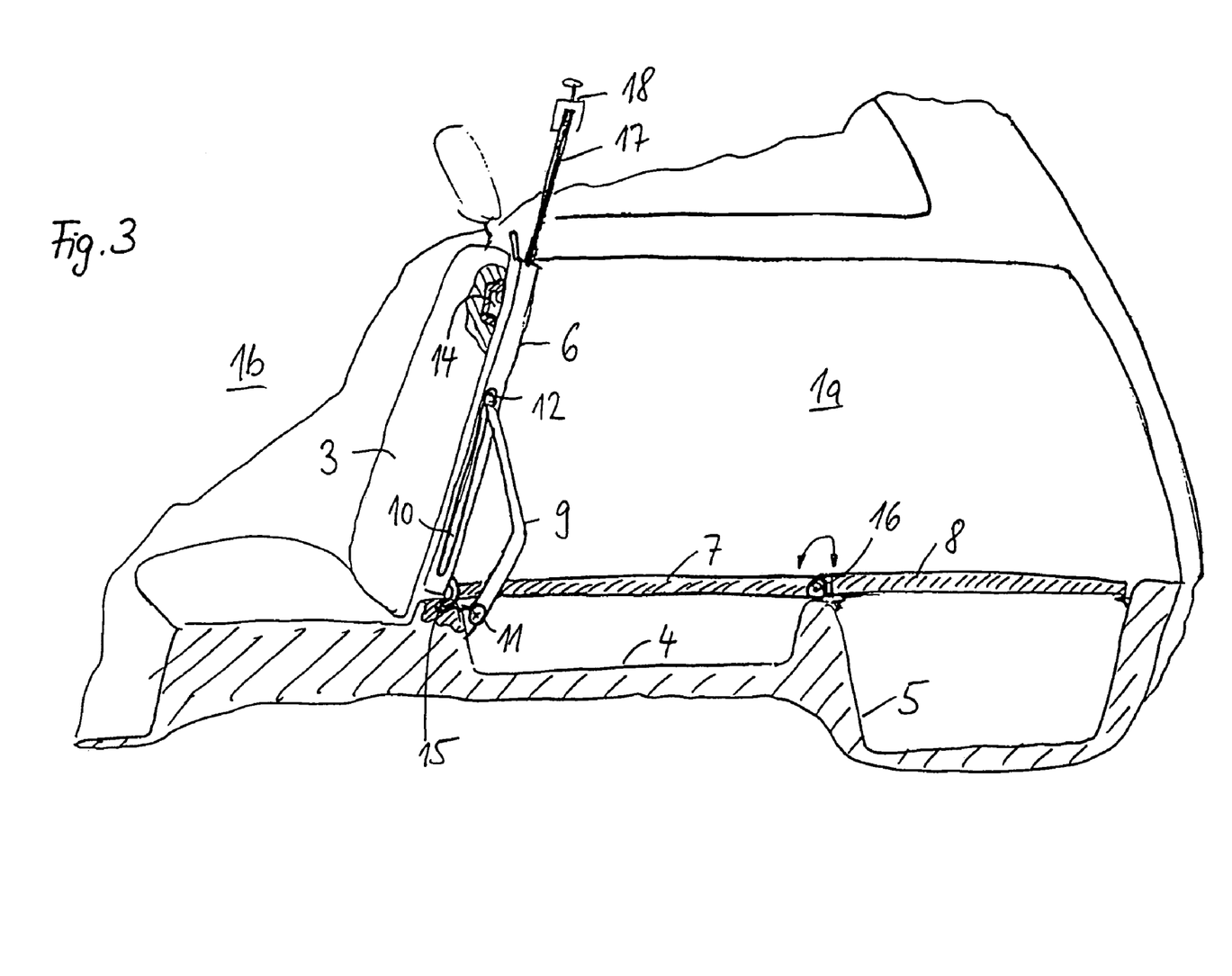
FIG. 3 The separating device according to FIGS. 1 and 2 in a first protection position.
Figure 4:
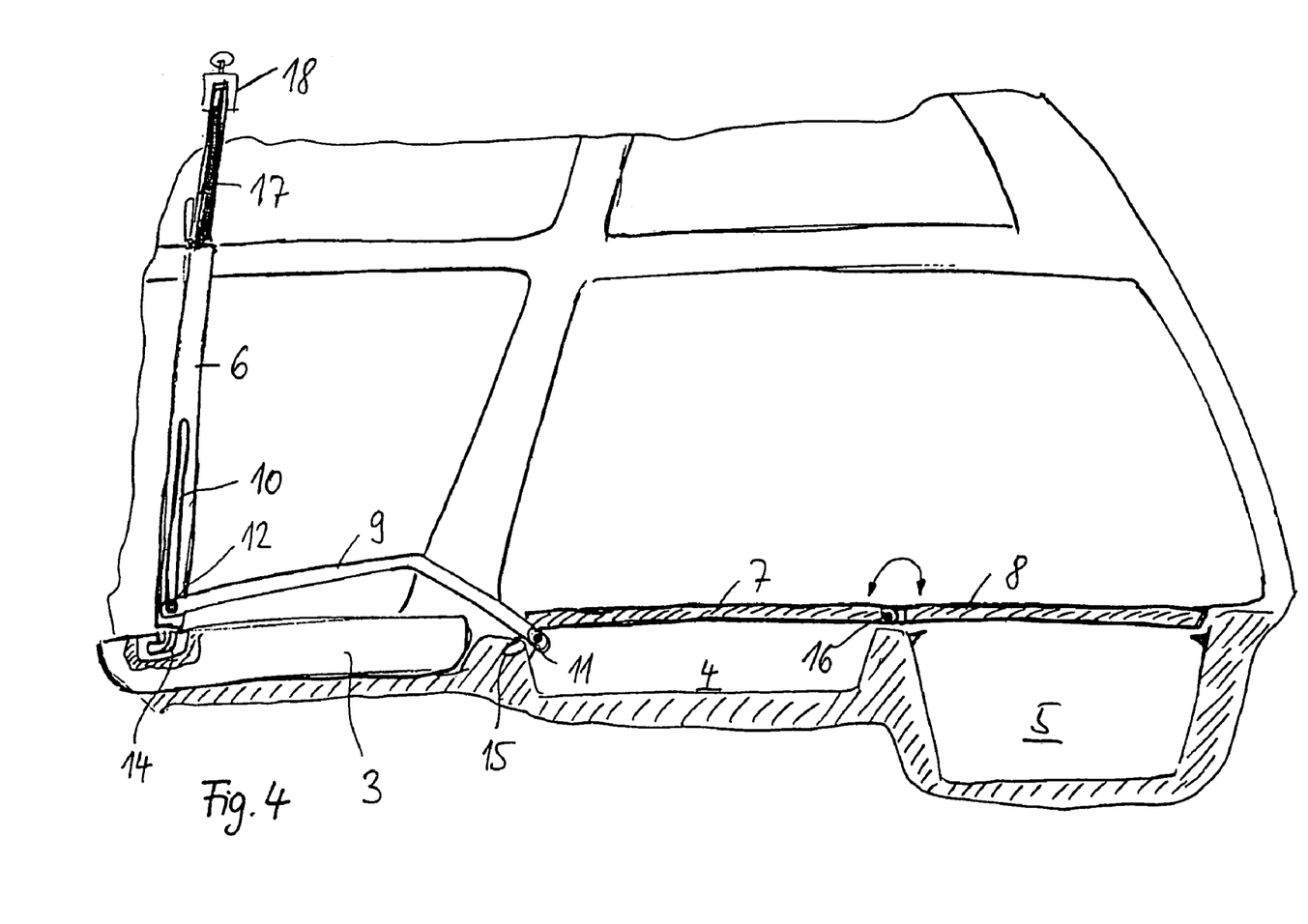
FIG. 4 The separating device according to FIG. 3 in a second protection position.

A motor vehicle according to FIGS. 1 to 4 is in the form of a station wagon or stretched limousine which, in addition to a vehicle occupant area 1b, have a luggage space or area 1a within the vehicle interior. Considered in the normal vehicle travel direction, the luggage space 1a is positioned behind a back rest arrangement 3 of a back bench seat. The back arrangement 3 of the bench seat can be tilted forwards and as a result the luggage space 1a can be enlarged in the forward direction (FIG. 4). As can be gathered from FIGS. 1 to 4, in a vehicle bottom 2 of the luggage space 1a are provided several depressions 4, 5, which are upwardly closed by releasable covering elements 7, 8.

A front depression 4, when considered in the normal travel direction, extends over substantially the entire width of the luggage space 1a and is closed by a covering element 7 also extending over the width of the space 1a. The covering element 7 is swivellably mounted on the back covering element 8 by means of a hinge arrangement 16, a hinge axis of the hinge arrangement 16 extending horizontally and in the vehicle transverse direction. In the embodiment shown the covering element 8 extends over the entire width of the luggage space 1a. In the closed position shown in FIG. 1, the two covering elements 7 and 8 form for the depressions 4, 5 virtually the entire surface of the vehicle bottom 2 of the luggage space 1a.

In the depression 4 below the covering element 7 a separating device is mounted in the countersunk rest position thereof. The separating device has a dimensionally stable flat structure in the form of a plate arrangement 6. The plate arrangement 6 is frame-like or box-like and is provided in its interior with a cavity, in which is integrated in translatory displaceable manner a transparent disk element 17. The cavity within the plate arrangement 6 is open towards one front end through which the transparent disk element 17, which is also dimensionally stable, can be extracted outwards in order to extend in a parallel, aligned manner the partition formed by the plate arrangement 6. The open front side of the cavity can be closed by a cover 13, which is swivellably retained on the plate arrangement 6.

The plate arrangement 6 extends over virtually the entire width of the luggage space 1a and has a length which in an upright protection position (FIGS. 3 and 4) is oriented in the vehicle height direction and which extends roughly from the vehicle bottom 2 to a vehicle flange edge. The disk arrangement 17 can be extracted upwards to such an extent that in the upright protection position of the plate arrangement 6, the disk arrangement extends between the vehicle flange edge and a roof area of the vehicle interior. In the embodiment shown an upper front edge of the disk arrangement 17 is provided with an extraction profile 18, which has holding elements for the roof-side fixing of the disk arrangement 17.

In the embodiment shown the disk arrangement is formed by a single transparent disk element made from shatterproof plastic. Preferably the disk element is made from polyacrylic glass. The disk arrangement 17 is mounted so as to move in translatory manner within the plate arrangement 6. For this purpose plain or roller bearing guides are provided in the vicinity of the cavity of the plate arrangement 6.

The covering profile 18 of the disk arrangement 17, which is fixed to the leading edge of the disk arrangement 17, is provided in the embodiment shown with holding elements in the form of suspension hooks, which cooperate with roof-side holding receptacles and bring about a fixing of the plate arrangement 6 in the upright protection position thereof and in the extended position of the disk arrangement 17.

Figure 1:
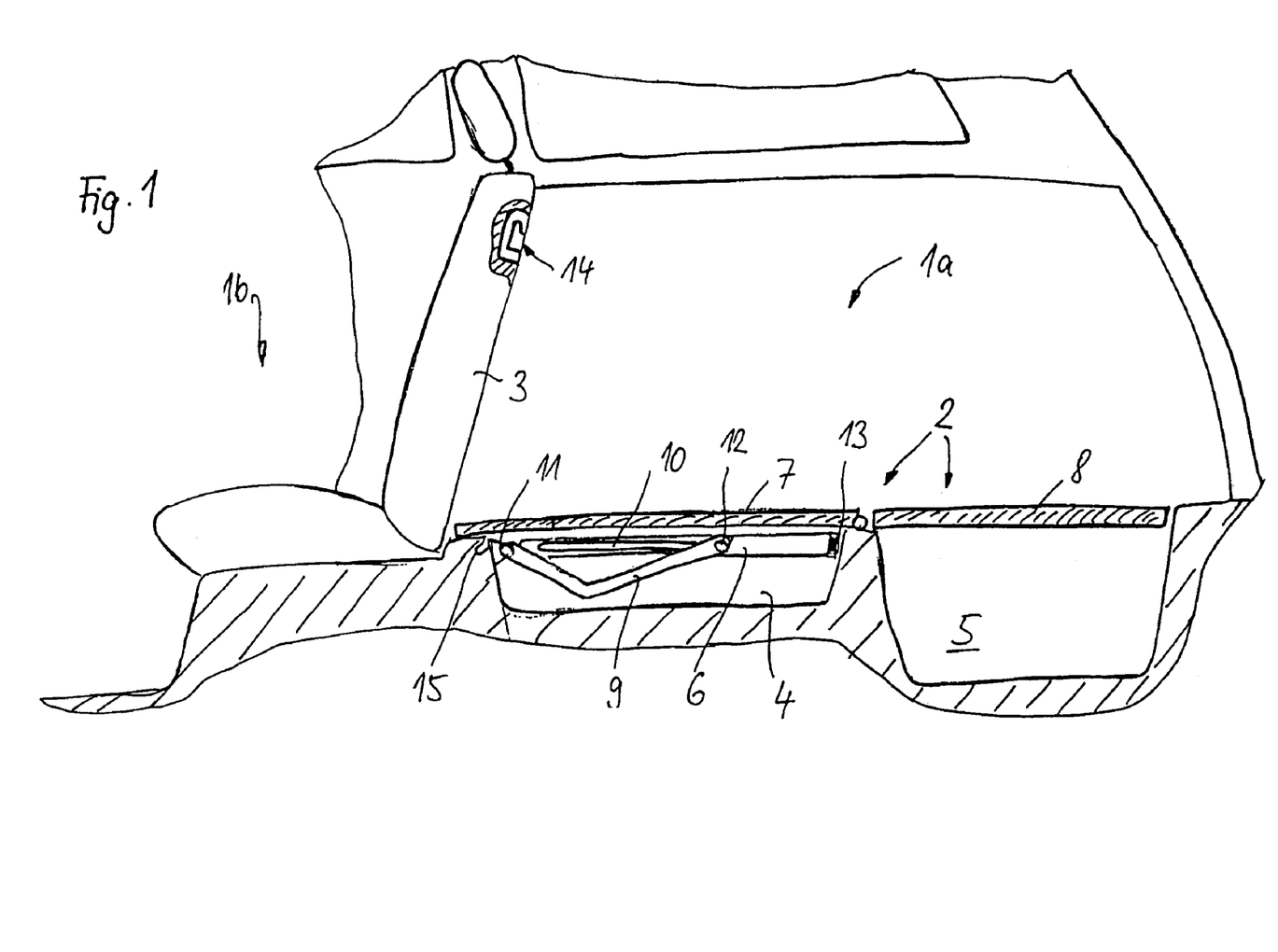
FIG. 1 Diagrammatically and in a part sectional side view a motor vehicle interior with an embodiment of an inventive separating device.
Figure 2:
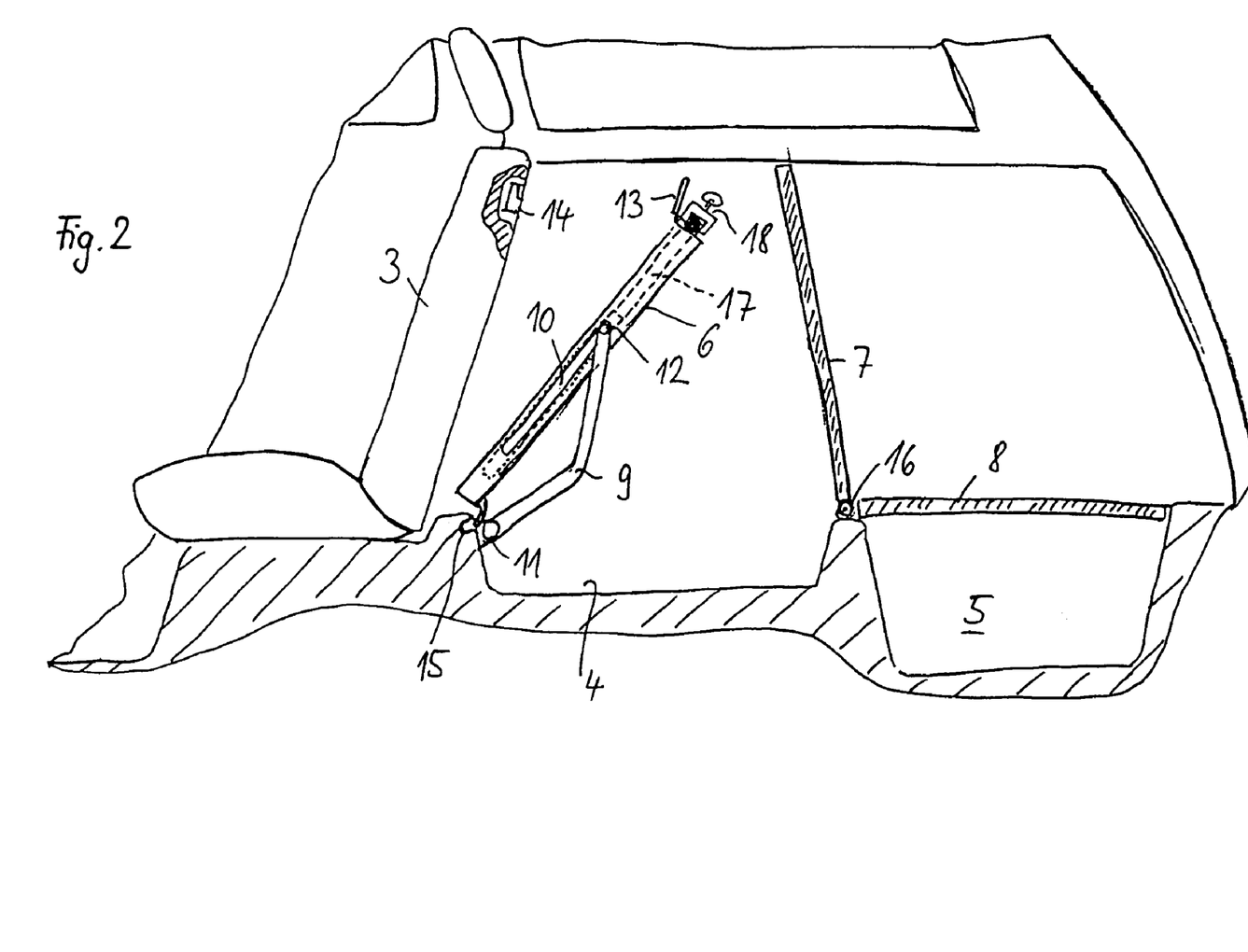
FIG. 2 The representation according to FIG. 1, the separating device being in an intermediate position modified compared with that of FIG. 1.

In order to obtain a clearly defined guidance of the plate arrangement 6 between the upright protection position according to FIGS. 3 and 4 and the countersunk rest position according to FIG. 1, a forced guidance device in the form of a linear guidance/swivelling kinematics 9, 10 is provided and must be manually operated in the embodiment shown. In the embodiment shown the linear guidance/swivelling kinematics is provided on either side of the plate arrangement 6 with an offset bracket 9, said brackets 9 being swivellably articulated in vehicle-fixed manner in the vicinity of the vehicle bottom by means of a common swivel bearing 11. To obtain a synchronized movement of both brackets 9, they are interconnected positively with respect to rotation in not shown manner by means of a connecting shaft running in the vehicle transverse direction and coaxially to the swivel axis of the swivel bearing 11. Each bracket 9 engages in a linear guide 10 of the plate arrangement 6, which is constructed as a slot guide on a lateral edge of the plate arrangement 6. A corresponding fulcrum 12 of each bracket 9 is displaceably mounted by means of a slide ring or sliding member in the slot guide 10. There is simultaneously a swivellability about a swivel axis of the fulcrum 12 parallel to the swivel axis of the swivel bearing 11. The slot guide 10 on each side of the plate arrangement 6 is parallel to the extraction or insertion direction of the disk arrangement 17.

In order to transfer the plate arrangement 6 from its rest position according to FIG. 1 into an upright protection position according to FIG. 3, with the plate arrangement 6 is additionally associated a swivel aid 15, which is formed on the one hand by a swivel hook arrangement in the vicinity of the lower end of the plate arrangement 6 on the one hand and by corresponding swivel receptacles 15 in the vehicle bottom on the other. On swivelling out the plate arrangement 6 from the rest position within the depression 4, the swivel hooks serving as curved plug-in elements pass in front of the open swivel receptacles 15 in the form of curved plug-in receptacles and slide into the same. The swivel receptacles 15 and associated swivel hooks are designed in such a way that they form a swivel axis or support for the plate arrangement 6. Thus, about said swivel axis the plate arrangement 6 is swivelled from its intermediate position according to FIG. 2 into the upright protection position. The disk arrangement 17 is then extracted upwards and is fixed in not shown manner in roof-side holders. The position of the roof-side holders and the position of the swivel receptacles 15 is chosen in such a way that in its upright protection position according to FIG. 3, the plate arrangement 6 is located directly behind the back rest arrangement 3.

To permit the movement of the plate arrangement 6 from the depression 4, the covering element 7 is swivelled upwards, so as to release the movement of the plate arrangement 6. When the plate arrangement 6 has assumed its protection position according to FIG. 3, the covering element 7 can be easily swivelled back again, so that the depression 4 is closed again.

In order to be able to build up a partition in the correspondingly widened luggage space when the back rest arrangement 3 is tilted forwards, in said arrangement 3 are provided swivel receptacles 4, which are constructed in the same way as the swivel receptacles 15 of the vehicle bottom. The plate arrangement 6 can be easily moved out of the protection position according to FIG. 3, so that the swivel hooks are necessarily extracted from the swivel receptacles 15. The brackets 9 are constructed in such a way that a further swivelling movement in the same direction is readily possible. Thus, the plate arrangement 6 is forwardly displaced in the travel direction until the swivel hooks engage in the swivel receptacles 14 in the vicinity of the folded back rest 3. Now the brackets 9 are pressed downwards into the particular slot guide 10 in the vicinity of their fulcrums 12 up to the lower end position of the slot guides 10. As a result of their offset, in this position the brackets 9 assume an over dead centre position in which they form a stable support for the plate arrangement 6. Thus, there is no real need for an additional support or holding. Additionally the disk arrangement 17 can be fixed in roof-side holders by means of the holding profile 18 and they are fitted vehicle-side in addition to the further rearwardly positioned, roof-side holders.

In the correspondingly reversed movement order, the plate arrangement 6 with integrated disk arrangement 17 can be transferred back into the rest position according to FIG. 1.

In the embodiment shown the corresponding movements of the plate arrangement 6 or disk arrangement 17 are brought about manually. In a not shown embodiment of the invention the forced guidance device for moving both the plate arrangement and the disk arrangement has drive means associated with it in order to perform or at least assist the corresponding movements in at least one movement direction. Suitable drive means are both mechanical spring accumulators or spring motors and electrical, pneumatic or hydraulic drives.

In the embodiment according to FIGS. 5 to 8, a vehicle interior is provided in the vicinity of a vehicle bottom 2c with at least one depression in which can be countersunk a seat arrangement or at least a back rest arrangement 3a thereof. In the vehicle longitudinal direction the vehicle bottom is provided with lateral guide rails 19, which are anchored on the vehicle bottom side. A rear side of each back rest arrangement 3a is provided with bottom rail portions 19, which are aligned with the bottom rails 19 of the vehicle bottom in the horizontal, folded rest position of the arrangement 3a. The back rest arrangement 3a can be in one or more parts. The vehicle bottom can either be constructed in such a way that it only has a single depression for receiving a single back rest arrangement 3a, or in such a way that in the vehicle longitudinal direction there are several trough-like depressions spaced from one another in the vehicle bottom. Correspondingly then more seat arrangements are provided. As a result it is possible to attain a variable space concept with respect to the vehicle interior in that several seat rows can be removed or, as needed, added. In the horizontal folded rest position the rear sides of the back rests terminate substantially flush with the remaining horizontal surface of the vehicle bottom 2c, so that there is a correspondingly enlarged free or luggage space. This solution is particularly appropriate for commercial vehicles for transporting people, particularly for buses.

Figure 5:
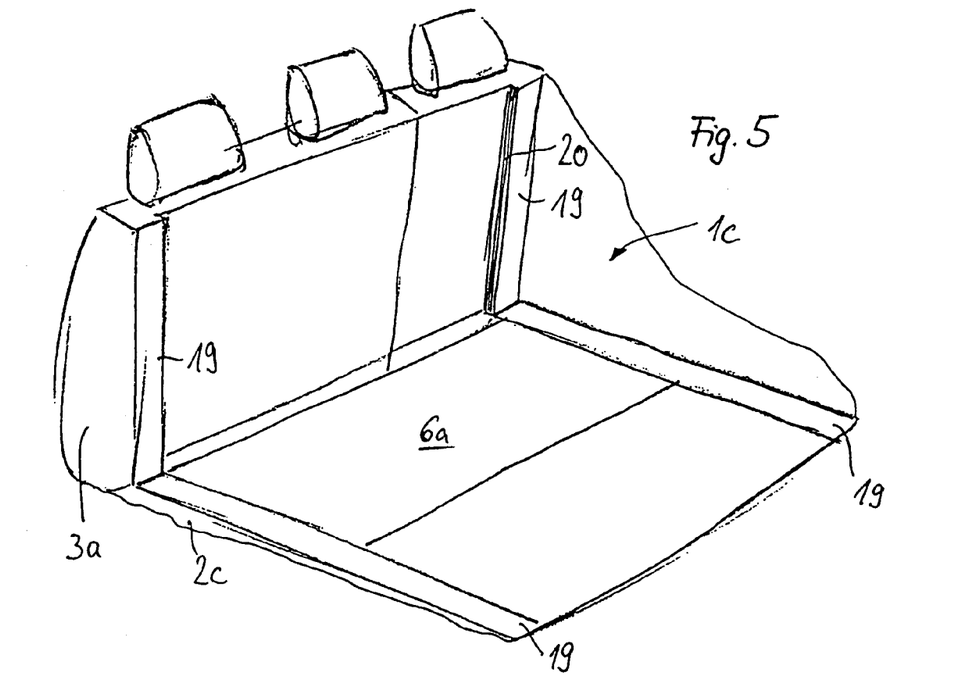
FIG. 5 A perspective view of a partial area of a further embodiment of a vehicle interior equipped with a separating device.

In order to also be able to variably construct a corresponding separation device with such a variable space concept, the separating device, much as in the embodiment according to FIGS. 1 to 4, has a dimensionally stable plate arrangement 6a, in which is extractably integrated a transparent disk arrangement 17a. The plate arrangement 6a is designed in frame-like or box-like manner in the same way as the plate arrangement described relative to FIGS. 1 to 4, so that the disk arrangement 17a can be extracted upwards from the plate arrangement 6a or countersunk therein. The plate arrangement 6a extends between the facing bottom rails 19 and, with the aid of combined swivel/sliding heads 23, in corresponding guide rail portions 20 of the bottom rails 19 is on the one hand linearly movable in the vehicle longitudinal direction and on the other is swivellably mounted about the swivel axis of the swivel/sliding heads. In its horizontal rest position, the plate arrangement 6 can be countersunk between the bottom rails 19 (FIG. 5). In its upright protection position according to FIG. 6, the plate arrangement 6 can be swivelled and then engages in the correspondingly recessed area of the back rest arrangement 3a between the facing bottom rail portions 19.

The guide rail portions 20 of the bottom rails 19 for linear and swivelling guidance of the plate arrangement 6a are positioned above the rear side of the back rest arrangement 3a as soon as the latter is transferred into its horizontal rest position. Thus, the plate arrangement 6a can be easily moved via the corresponding bottom rail portions 20 beyond the back rest arrangement 3a and fixed in its upright protection position at a suitable location.

Figure 6:
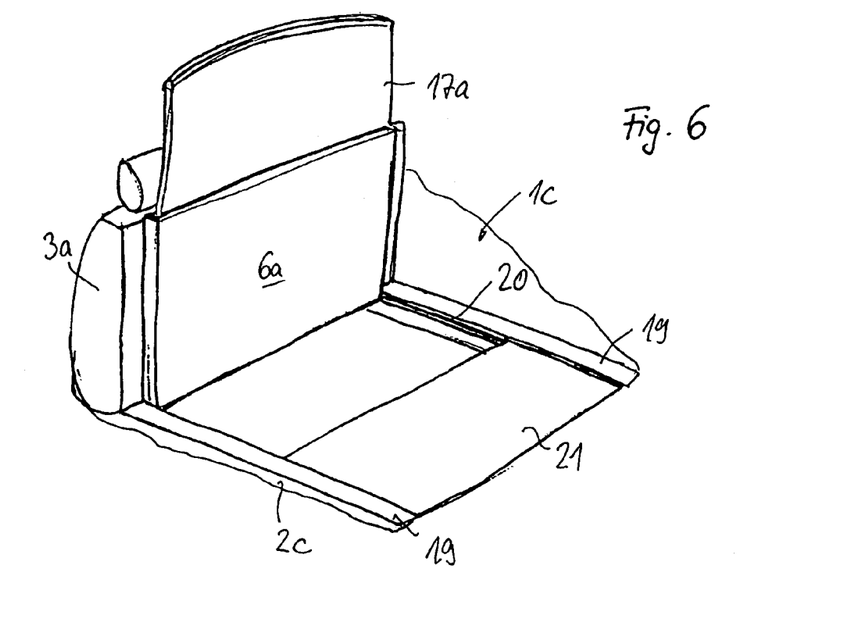
FIG. 6 The vehicle interior according to FIG. 5 with the separating device in a protection position.
Figure 7:
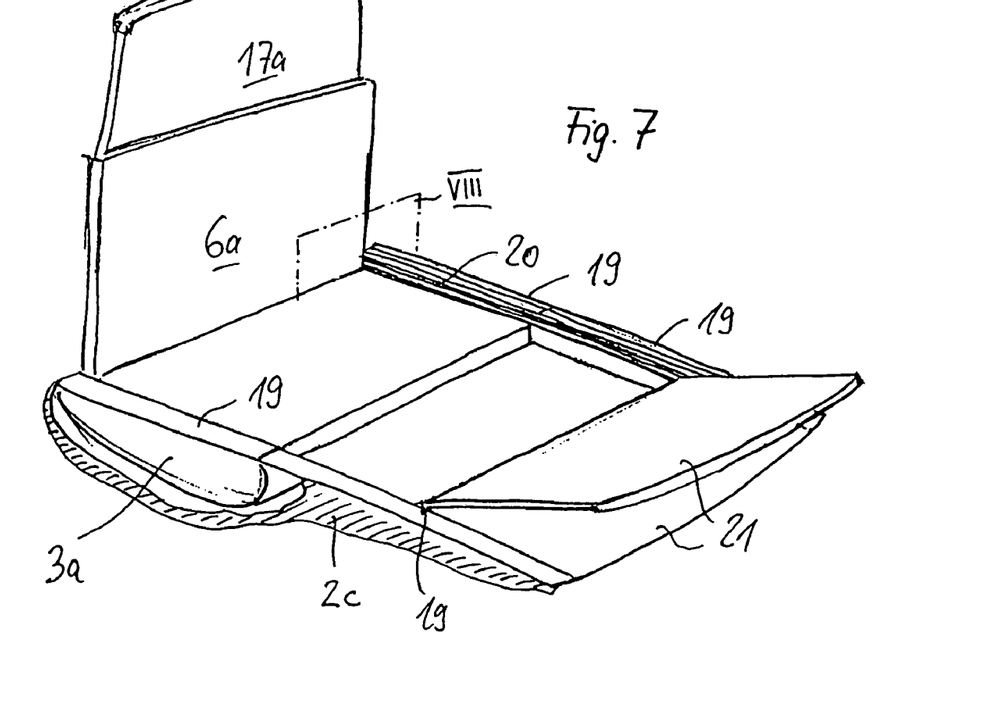
FIG. 7 The vehicle interior according to FIGS. 5 and 6 in a further protection position of the separating device.
Figure 8:
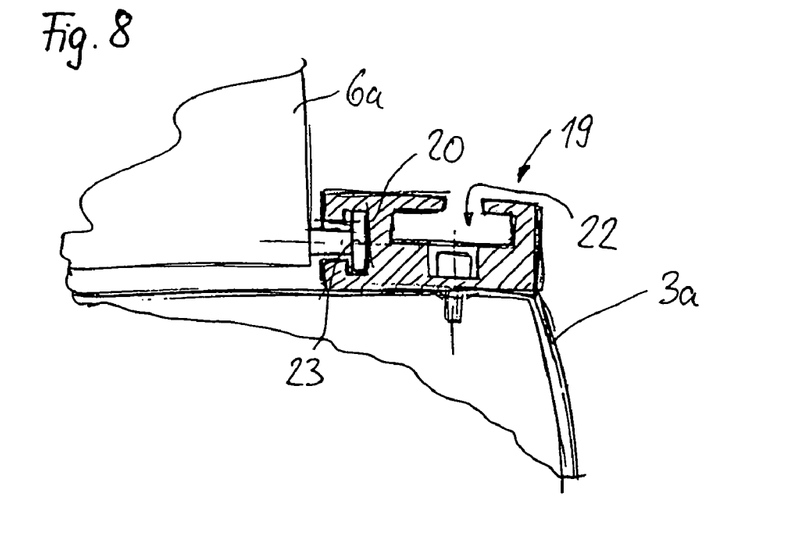
FIG. 8 A detail VII of the vehicle interior according to FIG. 7.

Between the bottom rails 19 and adjacently behind the recess area provided for the plate arrangement 6a there is a cover plate arrangement 21, which in FIG. 6 comprises a duplicated plate pair. In the doubling position the thickness of the plate pair 21 approximately corresponds to the thickness of the plate arrangement 6a. In order to cover the depression formed according to FIGS. 6 and 7 by the placing upright of the plate arrangement 6a in the vehicle bottom, one plate of the plate pair 21 can be easily tilted forwards.

The bottom rail portions 19 are firmly connected to the rear side of the back rest arrangement 3a. In addition to the guide rail portions 20, the bottom rails 19 and bottom rail portions 19 are provided with guide grooves which are open at the top level with the back rest arrangement 3a and into which can be inserted so as to slide therein suitable holding or guidance elements.

The invention claimed is:

1. Separating device for a vehicle interior with at least one dimensionally stable flat structure, which is positioned in at least one upright protection position, wherein with the flat structure is associated at least one transparent disk element, which is mounted in translatory movable manner parallel to the flat structure and which in a protection position extends the flat structure in a vehicle height direction, wherein the flat structure is movably mounted between a covering position flush with a vehicle bottom and said at least one upright protection position, and wherein the flat structure is so movably guided relative to the vehicle bottom by means of a forced guidance device that the flat structure can be transferred into a second protection position spaced relative to said at least one upright protection position in a vehicle longitudinal direction.

2. Separating device according to claim 1, wherein, in the upright protection position, the flat structure extends from the vehicle bottom to roughly level with a vehicle flange edge and wherein the at least one disk element in the protection position extends up to a vehicle roof.

3. Separating device according to claim 1, wherein the flat structure is split into at least two parts in conformance with a division of a vehicle back rest arrangement and the at least two parts are movable independently of one another, and wherein at least one disk element is associated with each of the at least two parts.

4. Separating device according to claim 1, wherein the flat structure is constructed as a plate arrangement in which is integrated in linearly displaceable manner the at least one disk element.

5. Separating device according to claim 4, wherein the at least one disk element is linearly displaceably guided in a slot guide of the plate arrangement and wherein a side of the slot guide is open at the top in an operating position and can be closed by a movable cover.

6. Separating device according to claim 1, wherein drive means are provided in order to assist or control the movement of the at least one disk element or the movement of the forced guidance device.

7. Separating device according to claim 1, wherein the forced guidance device has at least one combined linear guidance and swivelling kinematics, which acts between a vehicle side and the flat structure.

8. Separating device according to claim 7, wherein the linear guidance and swivelling kinematics has at least one bracket, which can be transferred into an over dead centre position securing the flat structure in said at least one upright protection position.

9. Separating device according to claim 1, wherein, in a rest position, the dimensionally stable flat structure is associated with a depression of the vehicle bottom, and wherein at least one adjacent, bottom-side covering element is provided which can be transferred into a closing position covering the depression when the dimensionally stable flat structure is transferred into an upright protection position.

10. Separating device according to claim 9, wherein the covering element is movably mounted between a doubling position superimposing a second covering element and an aligned, horizontal cover position connected to the second covering element.

11. Separating device according to claim 10, wherein, in the doubling position, together the two covering elements have roughly the same thickness as the dimensionally stable flat structure.

12. Separating device according to claim 1, further comprising guide rails running in the vehicle longitudinal direction and in which the flat structure is displaceably and swivellably mounted.

13. Separating device according to claim 12, wherein the at least one dimensionally stable flat structure is displaceably guided in the vehicle longitudinal direction by means of said guide rails beyond at least one of several depressions in the vehicle bottom or at least one folded seat arrangement received in one of the several depressions.

* * * * *